(12) United States Patent
Paps et al.

(10) Patent No.: US 8,481,655 B2
(45) Date of Patent: Jul. 9, 2013

(54) COPPER COMPLEXES OF AMINO-FUNCTIONAL ORGANOSILICON COMPOUNDS AND THEIR USE

(75) Inventors: Elizabeth Sorensen Paps, Onsted, MI (US); Fushu Fu, Rochester Hills, MI (US); Theodore D. Johnson, Adrian, MI (US)

(73) Assignee: Wacker Chemical Corporation, Adrian, MI (US)

( * ) Notice: Subject to any disclaimer, the term of this patent is extended or adjusted under 35 U.S.C. 154(b) by 0 days.

(21) Appl. No.: 13/191,766

(22) Filed: Jul. 27, 2011

(65) Prior Publication Data

US 2013/0030101 A1 Jan. 31, 2013

(51) Int. Cl.
*C08L 83/08* (2006.01)
*G03G 15/20* (2006.01)

(52) U.S. Cl.
USPC .............. 525/477; 399/333; 528/38; 528/395

(58) Field of Classification Search
None
See application file for complete search history.

(56) References Cited

U.S. PATENT DOCUMENTS

| | | |
|---|---|---|
| 4,777,087 A | 10/1988 | Heeks et al. |
| 4,925,895 A | 5/1990 | Heeks et al. |
| 5,091,278 A | 2/1992 | Teuscher et al. |
| 5,395,725 A | 3/1995 | Bluett et al. |
| 5,493,376 A | 2/1996 | Heeks |
| 5,604,039 A | 2/1997 | Chen et al. |
| 5,625,025 A | 4/1997 | Ishikawa et al. |
| 5,780,545 A | 7/1998 | Chen et al. |
| 5,864,740 A | 1/1999 | Heeks et al. |
| 6,045,961 A | 4/2000 | Heeks et al. |
| 6,218,495 B1 | 4/2001 | Braun et al. |
| 6,218,498 B1 | 4/2001 | Oberneder et al. |
| 6,254,811 B1 | 7/2001 | Finger et al. |
| 6,284,860 B1 | 9/2001 | Sommer et al. |
| 7,015,297 B2 | 3/2006 | Schindler et al. |
| 7,151,150 B2 | 12/2006 | Scheim et al. |
| 7,153,914 B2 | 12/2006 | Staiger et al. |
| 7,153,924 B2 | 12/2006 | Kuepfer et al. |
| 7,319,128 B2 | 1/2008 | Ziche et al. |
| 7,345,131 B2 | 3/2008 | Selbertinger et al. |
| 7,396,894 B2 | 7/2008 | Geisberger et al. |
| 7,511,110 B2 | 3/2009 | Fehn |
| 7,737,242 B2 | 6/2010 | Ziche et al. |
| 7,786,198 B2 | 8/2010 | Sixt et al. |
| 7,842,771 B2 | 11/2010 | Fehn |
| 2008/0306182 A1* | 12/2008 | Brugger et al. ............... 523/116 |
| 2011/0077365 A1 | 3/2011 | Yu et al. |

FOREIGN PATENT DOCUMENTS

JP 6-207103 A 7/1994

OTHER PUBLICATIONS

"Cu(II) Complexes in Organically-modified Silicate Gels" authored by Klonkowski et al. and published in the Journal of Non-Crystalline Solids (1991) 129, 101-108.*
"Catalytic Activity of Poly(Aminoorganosiloxanes)" authored by Koyama et al. And published in Polymer (1986) 27, 293-298.*
"Antimicrobial Properties of Complex Cu(II) Linked with the Surface of Poly(-aminopropyl)siloxane" authored by Stechenko and published in Medichna Khimiya (2010) 12(2), 19-22.*
Abstract for SU 348572 (Sep. 1969).*
Database WPI, Week 199434, Thomson Scientific, London, GB AN 1994-275989, XP002681303 corresponding to JP 6-207103.

* cited by examiner

*Primary Examiner* — Marc Zimmer
(74) *Attorney, Agent, or Firm* — Brooks Kushman P.C.

(57) ABSTRACT

Copper complexes of aminoorgano group-containing organosilicon compounds exhibit high thermal stability and can be used to impart thermal stability to a wide variety of polymer compositions. The complexes are particularly useful as constituents of xerographic rollers and fuser oils, and are simply and economically prepared.

23 Claims, 1 Drawing Sheet

COPPER COMPLEXES OF AMINO-FUNCTIONAL ORGANOSILICON COMPOUNDS AND THEIR USE

BACKGROUND OF THE INVENTION

1. Field of the Invention

The present invention pertains to copper complexes of amino-functional organosilicon compounds formed by reaction of the amino-functional organosilicon compound with copper(II) compounds. The resulting complexes are heat stable and may be employed to impart heat stability to organopolysiloxanes and other polymers.

2. Background Art

Organosilicon compounds, for example organosilanes, and in particular, polyorganosiloxanes, both linear and crosslinked, have numerous uses. Polyorganosiloxane fluids are often used as mold releases, as heat transfer oils, as lubricants, and as fuser oils in xerographic copying, for instance. Highly crosslinked organopolysiloxanes, in the form of silicone resins, are useful, inter alia, as powder coatings, components of paints and lacquers, and as molding resins. Crosslinked organopolysiloxanes in the form of silicone plastics and elastomers are useful in providing flexible molds, toner and fuser rolls for xerographic copying, rollers for conveyors and the like, and as sealants, encapsulants, and gasketing materials. Organosilanes are frequently used in the preparation and modification of organopolysiloxanes, as well as the modification of numerous other polymers, and for silanization of other substrates such as fillers, paper, textiles, etc. The uses described above are but a very small subset of uses for organopolysiloxanes and organosilanes.

Many of the uses of organosilicon compounds require thermal and oxidative stability for extended periods of time. This is particularly the case where extended exposure to high temperatures is required, for example in heat transfer oils, fuser rolls, fuser fluids, and the like, where temperatures up to 400° F. (ca. 200° C.) or higher may be commonplace.

In xerographic printers and copiers, for example, a fusible toner is electrostatically attracted to an imaging drum and transferred to a substrate, e.g. paper. The paper with toner passes through heated, abhesive rollers to melt the toner and facilitate its adherence onto the substrate and migration into the substrate to prepare a desirable image. The toner must not adhere to the fusing rollers, as otherwise subsequent images would bear some remnant of the preceding image. For this reason, abhesive polymers such as polyvinylidene fluorides, polytetrafluoroethylenes, and crosslinked silicone elastomers have been used in such applications.

Rollers of silicone are very commonplace, and are often fabricated to contain so-called "fuser oils," often polydimethylsiloxane fluids, to aid in their abhesive nature. These oils are physically incorporated, and slowly exude. The fuser oils may also be applied sporadically to the rollers in lieu of or in addition to being physically incorporated. Aminoalkyl-functional silicone fluids have proven to be especially advantageous, as also have mercaptoalkyl-functional silicone fluids.

While silicones such as polydimethylsiloxanes and poly (methylphenyl)siloxanes are among the most thermally stable polymers, their continued use at high temperatures causes even these polymers to alter their properties over time. For example, as disclosed in U.S. Pat. No. 4,777,087, which also contains a useful description of xerographic processes, the toughness of a silicone roller decreases by about half after 8,000 to 32,000 copies at fusing temperatures near 200° C. The hardness of the rollers increases, and cracks, pits, and eventually fracture of the roller can occur. The roller thus must be replaced after a defined duty cycle. These same problems can occur in silicone elastomers used in other fields, and in other polymers as well.

Many attempts have been used to stabilize silicone rollers against thermal degradation. In U.S. Pat. Nos. 4,777,087 and 4,925,895 for example, a complex of a transition metal salt with at least one polydentate chelating ligand is milled as a solid into one component of a two-component curable silicone composition also containing a silicone fuser fluid, which is then molded to form a roller body. However, this process requires milling the complex uniformly into the uncured composition, and while being a distinct improvement, still has less thermal stability than desired.

An additional problem encountered in xerographic copying is the generation of formaldehyde by decomposition, primarily from the fuser oil. Thus, U.S. Pat. No. 5,395,725 applies fuser oil directly to the fuser roll surface, the fuser oil containing at least one mercaptoalkyl-functional silicone and at least one aminoalkyl-functional silicone. U.S. Pat. No. 5,493,376 employs a fuser oil containing a silicone fluid and a thermal stabilizer which is a reaction product of chloroplatinic acid and a cyclic polysiloxane or a linear polysiloxane containing at least one unsaturated group. U.S. Pat. No. 5,864,740 is similar, but the stabilizer is the reaction product of a platinum group metal other than platinum, in particular a ruthenium compound, with a polyorganosiloxane. The use of expensive platinum group metals substantially increases cost.

In U.S. Pat. No. 5,604,039, fuser oils with increased thermal stability are prepared from a blend of polyorganosiloxane fluid and a phenol-functionalized polyorganosiloxane fluid, while U.S. Pat. No. 5,780,454 to the same inventor proposes the use of a blend of a conventional polyorganosiloxane fluid, a polyoxyalkylene ether-functionalized polyorganosiloxane fluid, and an antioxidant. U.S. Pat. No. 5,625,025 discloses temperature resistant oils for fuser oil applications as well as other applications such as high temperature lubricants and mold release agents. The compositions contain both amino-functional and phenol-functional diorganopolysiloxane fluids. In U.S. Pat. No. 6,045,961, fuser oils containing polyorganosiloxanes and a stabilizer which is the reaction product of a metal acetylacetonate with both linear and cyclic silicone fluids, each containing an unsaturated group. In columns 1-9 of the U.S. Pat. No. 6,045,961 patent, prior art attempts to obtain thermal stability are thoroughly discussed, as is also the long felt need for still further improvement.

It would be desirable to provide organosilicon compositions which exhibit high thermal stability without the need to mill in solid stabilizers, and which can function without the use of the very expensive metals of the platinum group as stabilizers. It would be further desirable to be able to provide such organosilicon compounds through an economical process with cost-effective ingredients.

SUMMARY OF THE INVENTION

It has now been surprisingly discovered that complexes of copper(II) compounds and aminoalkyl-functional organosilicon compounds can be economically prepared, and provide high thermal stability in liquid compositions as well as in elastomers prepared using the inventive stabilizers. Organosilicon compounds containing ethylenically or ethylynically unsaturated carbon-carbon bonds survive the complexation and can serve as components in addition-curable compositions, and silicon-bonded alkoxy groups also survive complexation, allowing for use as a reactive base polymer or crosslinker in condensation curable organopolysiloxanes and other polymers.

DETAILED DESCRIPTION OF THE PREFERRED EMBODIMENTS

The copper(II) complexes of the present invention are prepared by the reaction of copper(II) compounds, preferably copper(II) sulfate as the pentahydrate, by themselves or dissolved in water or other solvent, with an Si—C bonded aminoorgano-functionalized organsilicon compound. The organosilicon compound may be a silane, siloxane, silcarbene, etc. and is characterized as having an Si—C bonded aminoorgano group. Thus, organfc polymers bearing silyl groups, siloxy groups, polyorganosiloxy groups, etc., which also contain Si—C bonded aminoorgano groups are also useful in the present invention. The amino groups may be primary amino groups, secondary amino groups, or a mixture of primary and secondary amino groups. The aminoorgano groups preferably have the formula:

where R is hydrogen, a $C_{1-18}$ alkyl group, preferably methyl, ethyl, propyl, butyl, or octadecyl, a $C_{6-20}$ aryl group, preferably phenyl or naphthyl, or a $C_{7-21}$ arylalkyl or alkaryl group, preferably benzyl; R' is a divalent $C_{1-20}$ hydrocarbon radical which may be linear or branched, and the carbon chain of which is optionally interrupted by non-adjacent oxygen atoms, preferably ethyl, propyl, or butyl; n is 0 to 10, preferably 0 to 3, and most preferably 0 or 1; and R" is an SiC bonded, linear or branched organic group containing 1 to 20 carbon atoms, optionally interrupted by one or more non-adjacent O, N, or S atoms, and optionally additionally containing linkages.

R" may be aliphatic, cycloaliphatic, aryl, arylaliphatic, or aliphaticaryl. Most preferred aminoorganyl groups are those where R is H or methyl, where R' is ethylene or propylene, and R" is methylene or propylene.

The organosilicon compound may be a monosilane, for example a monosilane of the formula:

where $R^1$ is a $C_{1-20}$, optionally substituted hydrocarbon radical, wherein preferred substituents are halogen atoms, phosphorus-containing radicals, cyano radicals, —$OR^5$, —$R^5$—, —$NR^5{}_2$, —$NR^5$—C(O)—$NR^5{}_2$, —C(O)—$NR^5{}_2$, —C(O)—$R^5$, —C(O)$OR^5$, —$SO_2$-Ph and —$C_6F_5$, where $R^5$ is as defined as for R above and Ph is a phenyl radical.

Examples of $R^1$ radicals are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical, cycloalkyl radicals such as the cyclopentyl, cyclohexyl, cycloheptyl and methylcyclohexyl radicals, aryl radicals such as the phenyl, naphthyl, anthryl and phenanthryl radicals, alkaryl radicals such as the o-, m-, and p-tolyl radicals, xylyl radicals and ethylphenyl radicals, and aralkyl radicals such as the benzyl radical, and the α- and the β-phenylethyl radicals.

Examples of substituted $R^1$ radicals are haloalkyl radicals such as the 3,3,3-trifluoro-n-propyl radical, the 2,2,2,2',2',2'-hexafluoroisopropyl radical, the heptafluoroisopropyl radical, haloaryl radicals such as the o-, m- and p-chlorophenyl radicals, —$(CH_2)_n$—$N(R^5)C(O)NR^5{}_2$, —$(CH_2)_n$—C(O)$NR^5{}_2$, —$(CH_2)_n$—C(O)$R^5$, —$(CH_2)_n$—C(O)$OR^5$, —$(CH_2)_n$—C(O)$NR^5{}_2$, —$(CH_2)_n$—C(O)—$(CH_2)_m$—C(O)$CH_3$, —$(CH_2)_n$—$NR^5$—$(CH_2)_m$—$NR^5{}_2$, —$(CH_2)_n$—O—CO—$R^5$, —$(CH_2)_n$—O—$(CH_2)_m$—CH(OH)—$CH_2OH$, —$(CH_2)_n(OCH_2CH_2)_m$—$OR^5$, —$(CH_2)_n$—$SO_2$-Ph and —$(CH_2)_n$—O—$C_6F_5$, where $R^5$ is as defined above, n and m are identical or different integers from 0 to 10, and Ph designates the phenyl radical.

The $R^1$ radical is preferably a monovalent, SiC-bonded, optionally substituted hydrocarbon radical which has from 1 to 18 carbon atoms and is free of aliphatic carbon-carbon multiple bonds, more preferably a monovalent SiC-bonded hydrocarbon radical which has from 1 to 6 carbon atoms and is free of aliphatic carbon-carbon multiple bonds, especially the methyl or phenyl radical.

$R^2$ is a monovalent, optionally substituted SiC-bonded hydrocarbon radical with an aliphatic carbon-carbon multiple bond, preferably an ethylenically unsaturated group, or ethylynically unsaturated group. The $R^2$ radicals may be any groups amenable to an addition reaction (hydrosilylation) with an SiH-functional compound. If the $R^2$ radicals are SiC-bonded, substituted hydrocarbon radicals, preferred substituents are halogen atoms, cyano radicals and —$OR^5$ where $R^5$ is as defined above. The $R^2$ radicals are preferably alkenyl and alkynyl groups having from 2 to 16 carbon atoms, such as vinyl, allyl, methallyl, 1-propenyl, 5-hexenyl, ethynyl, butadienyl, hexadienyl, cyclopentenyl, cyclopentadienyl, cyclohexenyl, vinylcyclohexylethyl, divinylcyclohexylethyl, norbornenyl, vinylphenyl and styryl radicals, particular preference being given to using vinyl, allyl, propenyl, methylvinyl, 5-hexenyl, or cyclohexenyl, or an organic group containing a (meth)acrylate group. The vinyl group is preferred.

$R^3$ is a hydrolyzable group containing 1 to 20 carbon atoms, preferably an alkoxy or acyloxy group where the alkyl group of the alkoxy or acyloxy group may be linear or branched, optionally substituted, and may have the definition of R set forth previously, preferably methyl, ethyl, propyl, or butyl. $R^3$ is preferably a methoxy group or ethoxy group. $R^3$ may also be another hydrolyzable group, in particular an acetoxy group.

The values of x, a, b, and c can each be 0 to 3, with the proviso that the sum of x, a, b, and c does not exceed 3. Organosilanes with both silicon bonded hydrogen and hydrolyzable groups are not preferred. Preferred aminoorgano-functional silanes are those in which the silyl group SiC bonded to the aminoorgano group is selected from among trimethoxysilyl, triethoxysilyl, dimethoxymethylsilyl, dimethoxyethylsilyl, diethoxymethylsilyl, diethoxyethylsilyl, methoxydimethylsilyl, ethoxydimethylsilyl, vinyldimethoxysilyl, vinyldiethoxysilyl, vinylmethylmethoxysilyl, and other silyl groups bearing the preferred methoxy, ethoxy, acetoxy, methyl, ethyl, and vinyl groups.

The particular aminoorgano-functional silane is selected depending upon its intended use. For example, if the silane is intended as a crosslinker in moisture-curable organosilicon compositions, it is preferably selected to have two or three silicon-bonded alkoxy groups. If intended to react with but not to crosslink such compositions, it may have but one alkoxy group. Likewise, if intended to modify or crosslink addition curable organosilicon compositions or polymers containing ethylenic unsaturation, or prepared from unsaturated monomers, the silane may be selected to have at least one unsaturated group, preferably a vinyl group. By such selections, copper complexes of the silanes may be incorporated into a variety of polymers, to provide them with elevated thermal stability.

In addition to monosilanes, disilanes $A_dH_xR_a^1R_b^2R_c^3Si—SiR_c^2R_b^2R_a^1H_xA_d$ are also useful, although not preferred, as are also compounds similar to these disilanes but where the Si—Si bond is interrupted by a divalent hydrocarbon radical. Suitable divalent hydrocarbon radicals are those corresponding to the monovalent hydrocarbon radicals $R^1$, preferably methylene, ethylene, and propylene. In these compounds, d is 0 or 1, at least one d being 1. In all cases, silicon is tetravalent.

The aminoorgano-functional organopolysiloxanes and their variants containing groups such as Si—Si and Si—B—Si where B is a divalent hydrocarbon group as discussed previously in conjunction with the amino-functional organosilanes are well known. These organosilicon compounds, which are all termed "organopolysiloxanes" herein, may be cyclic, linear, branched, or resinous ("silicone resins") and are well known in the art. The organopolysiloxanes of the present invention preferably contain no Si—Si or Si—B—Si linkages unless these are unavoidable in their preparation.

The organopolysiloxanes preferably comprise units of the formula $SiO_{4/2}$ (Q units); $R^4SiO_{3/2}$ (T units); $R_2^4SiO_{2/2}$ (D units); and $R_3^4SiO_{1/2}$ (M units). In these tetra-, tri-, di-, and mono-functional units, $R^4$ may be an aminoorgano group, hydrogen, a $C_{1-20}$ hydrocarbon group, optionally containing O, N, or S heteroatoms, a hydroxyl group, or a hydrolyzable group, preferably an alkoxy or acetoxy group, with the proviso that the organopolysiloxane contain at least one and preferably two or more aminoorgano groups.

The $C_{1-20}$ hydrocarbon groups $R^4$ may be saturated or unsaturated. Examples include substituted and unsubstituted hydrocarbon alkyl groups such as those defined for $R^1$. $R^4$ may also be a hydrocarbon group containing ethylenic or ethylynic unsaturation, for example a vinyl group or a propargyl group, or an ethylenically unsaturated group such as vinyl, propenyl, isopropenyl, butenyl, hexenyl, cyclohexenyl, and the like, including those previously defined for $R^2$.

The hydrocarbon groups $R^4$ may be substituted, for example by halogens, such as the perfluoropropyl group, and may contain interspersed, non-adjacent O, N, or S atoms, or urea, urethane, carbonate or other groups. Further examples of $R^4$ unsaturated groups are those containing (meth)acrylato groups. Further $R^4$ may contain epoxy groups, such as the glycidoxypropyl group.

$R^4$ may also be a hydrolyzable group, preferably an alkoxy group. The hydrolyzable groups may include those identified by $R^3$ previously. Preferred hydrolyzable groups are methoxy and ethoxy, most preferably methoxy.

Preference is given to organopolysiloxanes which are linear or very lightly branched, i.e. those containing 5 mol percent or less of Q or T groups. These organopolysiloxanes are termed "substantially linear" herein. The predominant $R^4$ groups are those common in organosilicon chemistry, for example methyl, ethyl and propyl groups when $R^4$ is an alkyl group, preferably a methyl group, and vinyl, allyl, and hexenyl groups when $R^4$ is an unsaturated hydrocarbon. For some purposes, some $R^4$ may be polyoxyalkylene groups, preferably bonded to the siloxane chain by Si—C bonds. Terminal groups of the polyoxyalkylene groups are preferably hydroxyl or alkoxy groups. Such groups can be added to an organopolysiloxane having a silicon-bonded hydrogen by hydrosilylation of allyl-functional polyethers such as allyl-terminated polyethylene glycols or allyl-terminated polyethylene glycol monoethers.

In the organopolysiloxane, at least one $R^4$ is an aminoorgano group A as previously described.

It is preferred that the majority of $R^4$ groups are methyl or phenyl groups, more preferably methyl groups. The selection of functional $R^4$ groups depends upon the use of the organopolysiloxane. For example, of the organopolysiloxane is to be used as a fuser oil, it may be desirable to have non-complexed aminoalkyl groups present as an $R^4$ group, or to have only non-functional groups such as methyl or phenyl groups present, other than the complexed aminoorgano groups. It may also be advantageous for some $R^4$ to be mercapto hydrocarbon groups, in particular mercaptoalkyl groups, where the hydrocarbon groups of the mercapto hydrocarbon groups correspond to those previously cited for hydrocarbon groups $R^1$.

If, however, the organopolysiloxane is to be used as a component of a condensation-curable (i.e. moisture-curable) composition, it would be desirable to have silicon-bonded hydroxyl groups or hydrolyzable groups such as alkoxy or acetoxy groups present.

If the organopolysiloxane is to be used as a reactive component in a free radically cured addition polymerizable composition, it is necessary for some of the $R^4$, particularly for terminal $R^4$ groups, to contain unsaturated groups, preferably ethylenically or ethylynically unsaturated groups. For example, terminal or pendant (on-chain) $R^4$ may be vinyl or allyl groups.

If the organopolysiloxane is to be used in an addition-curable composition which cures by hydrosilylation, then one component may be an organopolysiloxane where some $R^4$ are hydrogen, and/or a second component may be an organopolysiloxane where some $R^4$ bear groups containing carbon-carbon unsaturation. In a less preferred embodiment, some $R^4$ may be hydrogen and some $R^4$ may be an unsaturated hydrocarbon radical, both in the same organopolysiloxane.

Curable compositions containing the organosilicon compound copper complexes of the invention, which may be referred to simply as "copper complexes" herein, ordinarily include conventional silane and/or organopolysiloxane components as well. Such ingredients, which include reactive base polymers, crosslinkers, chain extenders, catalysts, etc., in addition to non-reactive components such as non-functional silicone oils or silicone oils which are functionalized, but with a functional group which is essentially unreactive under the curing conditions, can also be present, and in some cases are preferred to be present. The various ingredients of both addition curable and condensation curable organosilicon compositions are well known, and may be found, for example, in Noll, Chemistry and Technology of Silicones, Academic Press, © 1968, and in many publications and patents, including, inter alia, U.S. Pat. Nos. 7,153,914; 7,396,894; 7,511,110; 7,786,198; 7,842,771; 7,151,150; 7,015,297; 6,284,860; 6,254,811; 6,218,495; and 6,218,498, the disclosures of which are incorporated herein by reference.

As is well known, curing and crosslinking generally require catalysts, as reflected in the references cited above. Condensation curable systems have often employed tin catalysts, often with amine co-catalysts, although many other catalysts are also useful. By using reactive base polymers containing α-silyl groups and/or α-silane crosslinkers, catalysts may sometimes be dispensed with. Addition-curable (non-hydrosilylation curing) systems generally employ azo compounds, hydroperoxides, peroxides, or other free radical initiators as catalysts, for example dicumyl peroxide, whereas addition-curable compositions which cure by hydrosilylation generally employ catalysts from the platinum group, e.g. platinum, rhodium, or iridium. Common platinum catalysts include hexachloroplatinic acid and Karstedt's catalyst, for example. All catalysts, whether for condensation curing or either of the two types of addition-curing systems are well known and commercially available.

Because reactive groups such as alkoxy groups and unsaturated groups, e.g. the vinyl group, survive preparation of the copper complexes of the invention, these complexes can be used, in the case of the silanes, as monomers, functionalizers, chain extenders, and crosslinkers in numerous systems, and as organopolysiloxane complexes, as base polymers or reactive macromers in others. This opens a wide array of possibilities for incorporation of the copper organosilicon complexes as stabilizers in numerous polymer systems.

In moisture curable systems, for example, trialkoxysilanes such as methyltrimethoxysilane are often used as crosslinkers. Replacing all or a part of these traditional and widely used crosslinkers with a copper complexed silane of the present invention can confer increased thermal stability to the cured elastomer. In this respect, see, e.g. U.S. Pat. Nos. 7,153,924; 7,737,242; 7,319,128; and 7,345,131, incorporated herein by reference, where the base polymer is a polyurethane urea polymer bearing terminal alkoxysilyl groups.

By the same token, copper complexes of silanes such as vinyldimethoxyaminopropylsilane or vinyldimethylaminopropylsilane may be copolymerized during cure of vinyl-terminated organopolysiloxanes or other polymers containing ethylenic unsaturation, thus incorporating the copper complex at the molecular level.

The copper complexes are prepared by reaction of the aminoorgano silicon compound, whether a silane, siloxane, polysiloxane, etc., with the copper(II) compound, either as such, i.e. in solid particulate form, or dissolved in solvent.

Any suitable copper(II) compound which is reactive with the aminoorgano compound may be used. Examples include, without limitation, copper(II) halides such as copper(II) fluoride, copper(II) chloride, copper(II) bromide, and copper(II) iodide; copper(II) carboxylates such as copper(II) acetate, copper(II) propionate and copper(II) butyrate; copper(II) chelates such as copper(II) acetylacetonate; and other copper (II) salts such as copper(II) sulfate and copper(II) nitrate. It is also possible, though not preferred, to employ the corresponding copper (I) compounds, with these being oxidized in situ to copper(II), for example with oxygen, air, or oxidizing agents.

The reaction may take place at any desired temperature at which the reaction mixture remains fluid, for example but not by limitation from −10° C. to 200° C., preferably 0° C. to 150° C., and most preferably from 20-25° C. (essentially room temperature) to about 120° C. The copper compound may be added to the organopolysiloxane, or the organopolysiloxane may be added to the copper compound. In general, a slight exotherm is observed when the reactants are mixed, and this exotherm may continue through the majority of the reaction period, which may be, for example, from 10 minutes to 10 hours, preferably 1 to 5 hours. The mixture may be heated to complete the reaction, and heating to the previously mentioned reaction temperatures is preferred. The progress of the reaction may be visually assessed, but often this is not necessary, reaction times of, for example, 30 minutes to two hours ordinarily being sufficient.

When the copper compound is dissolved in solvent, both protic and aprotic solvents may be used. For hydrates of copper compounds, water is a suitable solvent, and is preferably used in as small an amount as possible. Alcohols, particularly lower alcohols such as methanol, ethanol, propanol, and isopropanol may be used, as also may ketones such as methylethylketone, diethylketone, and lower esters such as ethyl acetate and t-butylacetate. Lower glycols are also useful, such as ethylene glycol, propylene glycol, diethylene glycol, etc., as well as their mono- and di-ethers, such as 2-methoxyethanol and dimethoxyethane. Aprotic solvents such as dimethylformamide, tetrahydrofuran and dimethylsulfoxide may be used, as well as ethers such as diethylether.

When solvents other than water are used, it is preferably that they are of low molecular weight and/or have low boiling points, such that they can be removed readily by distillation or stripping with nitrogen, etc. Hydrocarbon solvents may also be used, but principally to lower viscosity, as most copper compounds are not appreciably soluble in hydrocarbons. The solvent, if used, may be left in the product, or may be removed by conventional methods such as distillation, preferably wiped-film or falling film evaporation, or by stripping. For applications where the presence of solvent is not critical, whatever solvent remains in the product may be left there, in particular with benign solvents such as ethanol and low VOC equivalent solvents such as t-butylacetate. When water is used as a solvent, some cloudiness of the product may be expected, since water is often incompatible with organopolysiloxanes, particularly those with low amine numbers and/or high molecular weights.

The product is generally filtered to remove any solids left in the reaction mixture, although in may end applications, the presence of suspended solids is not critical.

When copper(II) sulfate is used in preparing the aminoorgano-functional silanes and siloxanes, it is preferably used in the form of its pentahydrate, i.e. $CuSO_4 \cdot 5H_2O$, either neat or dissolved in suitable solvent. Preferred solvents are water and lower alcohols, for example methanol or ethanol. Mixtures of water and alcohol are also useful. Aprotic polar solvents such as dimethylsulfoxide, dimethylformamide, tetrahydrofuran and the like may also be suitable.

If the copper compound is used in neat rather than dissolved form, it is preferably finely ground. Mean particle sizes in the range, for example, of 5 nm to 100 μm, more preferably 20 nm to 50 μm, are preferred. Smaller particle sizes have the advantage of faster and more complete reaction. Copper compounds may be reduced to small particle size by conventional grinding and milling techniques, for example sand milling, ball milling, and gas-jet milling. In the case of small particle sizes, it is preferred that size reduction take place in an essentially inert atmosphere, for example nitrogen gas.

When the copper compound is used in solution, and when water is present, it is frequently advantageous that the amount of water be as small as possible. After the reaction, the residual water will generally be removed from the product, for example by stripping in vacuo, or by distillation under vacuum. In the case where aminoorgano-functional silanes contain hydrolyzable groups (including C1), and are intended to be fully or partially hydrolyzed, water present as a solvent can be removed by chemical reaction during the hydrolysis.

Other silanes or hydrolyzable siloxanes and polysiloxanes may also be present during this hydrolysis. A wide variety of copper-containing organosilicon compounds can be thusly prepared.

The mol ratio of copper (as metallic copper) to amine groups may span a wide range, for example 0.01:1 to about 10:1. A ratio of 1:4 has been proven very satisfactory. Higher than stoichiometric amounts of copper may be used, but it is expected that unreacted copper compound may remain in the product, either in dissolved or solid form. If in solid form, the solid copper compound can be removed by filtration. At low copper to amine ratios, it is expected that virtually all the copper will react to form a copper complex. Such low ratios are particularly useful when the number of aminoorgano groups in the organosilicon compound is high. For organosilicon compounds with relatively low numbers of aminoorgano groups, it may be desired to use a higher Cu/amine ratio, for example 0.5:1 or 1:1, or higher.

The reaction between the copper compound and the aminoorgano-functional organosilicon compound may be catalyzed. Catalysis may lower the temperature required to form the complex and/or increase the amount of copper incorporated into the complex. Suitable catalysts are weakly basic salts, particularly alkali metal salts of organic carboxylic acids, preferably of acetic acid or propionic acid. A preferred catalyst is potassium acetate. The catalyst may be added separately, or may be included by virtue of the method used to synthesize the aminoorgano-functional organosilicon compound.

In any event, the product must contain sufficient complexed Cu to facilitate thermal stability in the organosilicon compound, or in compositions into which it is incorporated. In general, the product, after being coarsely filtered to remove gross precipitates, will contain from 20 to 20,000 ppm Cu, more preferably 50 to 2000 ppm, and most preferably from about 100 ppm to about 1000 ppm. The products are generally colored, most often from a light "robin's egg blue" to a relatively dark blue. In many cases, the product may be opaque or translucent. In many applications it is not necessary to finely filter such products to remove the very fine particulates they contain.

Copper complexes of organopolysiloxanes are useful by themselves as heat transfer fluids, fuser oils, etc., but will often be added as a stabilizing component to such compositions. For example in heat transfer fluids, the base fluid may be a trimethylsilyl-terminated polydimethylsiloxane or poly (methylphenyl)siloxane, or other base fluid. In the case of fuser oils, the copper complexes of the invention may be added to conventional organopolysiloxane fluids, particularly those bearing mercaptoalkyl or aminoalkyl groups.

When used in conjunction with other polymers as a thermal stabilizer, the amounts of the copper complex used should be an effective stabilizing amount, which is defined as an amount which provides an observable, i.e. measurable increase in thermal stability as compared to the same composition without the stabilizer. Tests commonplace in the industry may be used. Such tests generally involve holding a sample at elevated temperature, with or without oxygen present, and observing changes in physical or chemical properties, particularly physical properties. With solid plastics, rubbers, and elastomers, for example, properties such as hardness, tensile strength, modulus, elongation, tear strength, etc., may be monitored. It is not necessary that all properties be improved. However, it is preferable that at least the properties of concern related to the end use of the product be improved.

The amount of thermal stabilizer added to a particular composition will vary as the nature of the stabilizer varies and as the other constituents vary as well, in particular the make-up and any functionality of the polymer ingredients of the composition. Amounts of 0.1 weight percent to 100 weight percent (i.e. the complex comprises all or substantially all of the composition) are useful, preferably 0.2 to 10 weight percent, and most preferably 0.5 to 4 weight percent. Some typical results and methods of assessment are illustrated by the Examples herein, which should not be considered as limiting the scope of the invention in any way.

In these applications as well as those described below, it may be advantageous to add additional stabilizers as well, in addition to other common additives such as biocides, antioxidants, and the like.

In lieu of aminoorgano-functional polysiloxanes for preparation of the complexes of the invention, polymers which contain aminoorganosilyl groups or aminoorgano-functional organopolysiloxane groups may be reacted with copper compounds in the manner described previously to impart such polymers with increased thermal stability. The copper complexes of the subject invention can also serve as monomers, macromers, or chain extending or terminating agents in the preparation of such polymers. Preferred polymers containing an aminoorgano-functional silyl group or an aminoorgano-functional siloxane or polysiloxane group are block siloxane-urea-urethane copolymers, wherein an aminoalkyl-functional polymer is reacted with less than a stoichiometric amount of isocyanate, leaving unreacted amino groups, or where a polymer bearing hydroxyl groups is reacted with a cyclic silazane such as described in U.S. Pat. No. 7,153,924, which is incorporated herein by reference.

Having generally described this invention, a further understanding can be obtained by reference to certain specific examples which are provided herein for purposes of illustration only and are not intended to be limiting unless otherwise specified.

EXAMPLE 1

To 5 g of aminopropyl-functional polydimethylsiloxane with a degree of polymerization between 250 and 300, and containing on average one pendant aminopropyl group, with an amine concentration of 0.049 meq/g, was added a solution of 0.06 g copper(II) sulfate pentahydrate in 5 g of deionized ("DI") water. The ratio of $CuSO_4$ to amine was approximately 1:1. The mixture turned hazy with a slight bluish color, and was placed in an oven at 117° C. for five days. Obtained was a whitish fluid containing a light blue precipitate.

The copper complex thus formed, in an amount of 0.3 g, was blended with 6 g of a trimethylsilyl-terminated fluorosilicone copolymer having 135-140 repeating dimethylsiloxy groups and on average 7-9 methyl(2-perfluorohexylethyl) siloxy units, having a viscosity (25° C.) of 180-260 $mm^2/s$. The blend exhibited a slight haze, and was heated to 260° C. for 6 hours, along with a sample of the fluorosilicone copolymer containing no copper complex (Comparative Example C1). Byproducts resulting from thermal treatment were measured by GC/MS headspace chromatography. The results are presented in Table 1 below, in GC/MS area counts:

TABLE 1

| Byproduct | Example 1 | Comparative Example C1 |
| --- | --- | --- |
| difluorodimethylsilane | 708,053 | 2,453,401 |
| fluorotrimethylsilane | 15,378 | 2,794,025 |
| nonafluoropentane | 0 | 9,437,856 |
| dodecafluorooctenal | 493,544 | 59,277,896 |
| tridecafluorooctanal | 0 | 1,296,990 |
| Total | 1,216,975 | 75,260,168 |

The results in Table 1 illustrate a remarkable, surprising and unexpected decrease in byproduct formation, indicating much higher thermal stability imparted by the copper complex of the aminoorganopolysiloxane.

EXAMPLE 2

An aminopropyl hydrolysate consisting of dimethylsilanol-terminated poly(methyl)(aminopropyl)siloxane with a degree of polymerization between 100 and 500 in an amount of 93.6 g was added to a 500 ml, 3-neck round bottom flask, and a solution of 50 g copper(II) sulfate pentahydrate in 151 g of DI water was added slowly in portions while stirring at high speed, and held at room temperature for one hour. A slight exotherm was detected after each addition of copper sulfate solution. Vacuum was applied, reaching a pressure of approximately 60 torr. The flask was slowly heated and vacuum adjusted to reduce foaming. After about 5 hours, at which point the temperature had reached 78° C., the vacuum was broken with nitrogen and 8.1 g of hexamethyldisiloxane was added to reduce viscosity and to prevent gelling. The flask was further heated to 90° C. and lowered to 83-85° C. after five to ten minutes. A dark brown residue formed near the temperature probe and over the areas of the flask above the liquid. The contents were allowed to cool under nitrogen. Within a few days, the complex was observed to be a waxy deep blue solid with brown streaks.

EXAMPLE 3

The aminoorgano polydimethylsiloxane used in Example 1 (200 g) was introduced into a 500 ml 3-neck round bottom flask. To the flask was then added with stirring, a solution of 0.58 g copper(II) sulfate pentahydrate in 2.02 g DI water. A slight (10° C.) exotherm was noted. The contents were mixed thoroughly for 30 minutes at autogenous temperature and held at full vacuum (ca. 100 ton) until foaming had ceased. The flask was then slowly heated to 86° C. over about 1 hour, and then cooled under nitrogen. The $CuSO_4$:$NH_2$ ratio was about 1:4. A sample was analyzed for copper content by atomic absorbtion spectrometry after filtration to remove any solids present by atomic absorbtion spectrometry and was found to contain 238 ppm copper.

Varying amounts of the copper complex thus obtained were added to a fluorosilicone oil. Amounts of 1% or greater resulted in fluids which exhibited slight cloudiness or haze. The compositions were tested for thermal stability by comparing outgassing of byproducts after storage at 260° C. for 6 hours. The results are presented in Table 2 below:

TABLE 2

| Byproduct | Control | 0.1% complex | 1.0% complex | 10% complex |
| --- | --- | --- | --- | --- |
| difluorodimethylsilane | 2,947,047 | 1,207,237 | 492,677 | 491,179 |
| fluorotrimethylsilane | 1,316,722 | 1,138,792 | 583,573 | 580,751 |
| nonafluoropentane | 161,652 | 0 | 82,991 | 83,771 |
| dodecafluorooctenal | 25,332,362 | 28,991,958 | 28,650,526 | 28,901,662 |
| tridecafluorooctanol | 1,222,613 | 6,368 | 12,136 | 9,138 |
| Total | 30,980,396 | 31,344,355 | 29,821,903 | 30,066,501 |

The results in Table 2 show a significant reduction in all byproducts with the exception of dodecafluorooctenal, which showed a slight increase and was substantially independent of complex concentration. When amounts of stabilizer of 1 weight percent or higher were used, there was an overall decrease in byproduct formation.

EXAMPLE 4

The complex was also tested by measuring viscosity in an aminosilicone fluid at 265° C. until gelation occurred. The composition consisting of approximately 76 weight percent polydimethylsiloxanes with a degree of polymerization of about 175 and 24 weight percent of an aminoalkyl-functional polydimethylsiloxanes having a degree of polymerization of 250 and containing on average one 3-aminopropylmethylsiloxy group. The results with 1.0% copper complex and 0.01% zinc stearate are compared over time with the aminosilicone fluid alone and the aminosilicone fluid with 0.01% zinc stearate.

TABLE 3

| Day/Viscosity, cPs | Fluorosilicone only | 0.01% zinc stearate | 0.01% zinc stearate 1.0% copper complex |
| --- | --- | --- | --- |
| Initial | 518 | 530 | 535 |
| 1 | 503 | 482 | 500 |
| 5 | 1718 | 707 | 642 |
| 6 | cured | 951 | 703 |
| 7 | — | 1390 | 712 |
| 9 | — | cured | — |
| 14 | — | — | 2420 |
| 15 | — | — | cured |

Table 3 shows that the copper complex of the invention delayed curing over a composition containing only zinc stearate as a thermal stabilizer, by a factor of approximately 1.7. A further test of the same compositions exhibited curing at 4 days, 7 days, and 14 days, respectively.

EXAMPLE 5

Fuser Oil Stability Testing

A variety of xerographic fuser oils were tested for stability with and without stabilizers, by measuring the viscosity over time at 230° C. The results are presented in FIG. 1. The compositions tested, labeled as fuser oils 1-10, had the compositions set forth in Table 4 below. All stabilizers were present at 1.5 weight percent. PDMS is polydimethylsiloxane.

TABLE 4

| Fuser Oil | Base Oil | Stabilizer |
| --- | --- | --- |
| 1 | 300 cSt PDMS | none |
| 2 | 300 cSt PDMS | iron octoate |

TABLE 4-continued

| Fuser Oil | Base Oil | Stabilizer |
|---|---|---|
| 3 | 300 cSt PDMS | proprietary stabilizer |
| 4 | 300 cSt PDMS | copper complex of Example 3 |
| 5 | mercaptoalkyl fluid and PDMS | none |
| 6 | aminoalkyl fluid 1[1] | none |
| 7 | aminoalkyl fluid 2[2] | none |
| 8 | aminoalkyl fluid 2[2] | iron octoate |
| 9 | aminoalkyl fluid 2[2] | proprietary stabilizer |
| 10 | aminoalkyl fluid 2[2] | copper complex of Example 3 |

Figure 1:
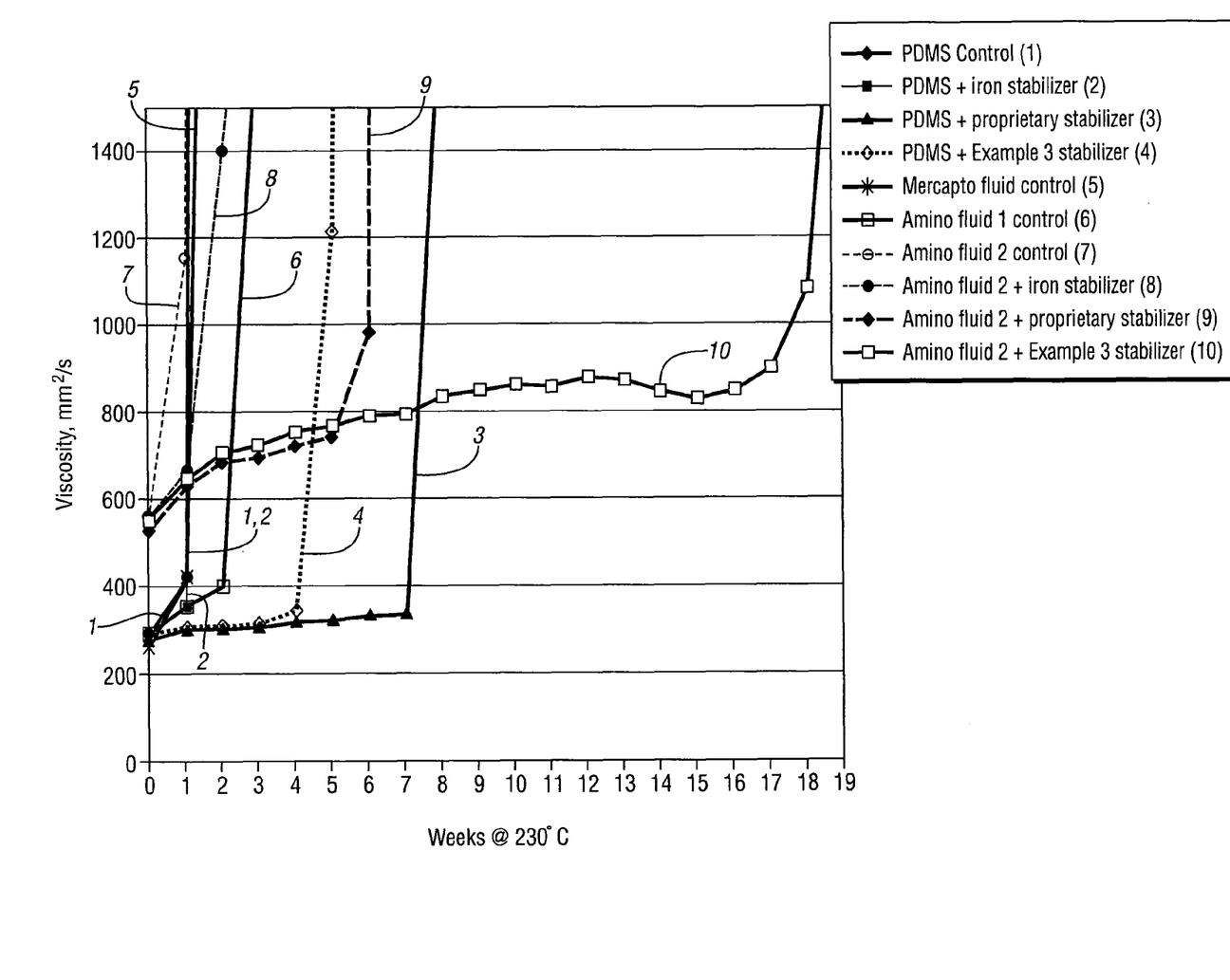
FIG. 1 illustrates change in viscosity against time for several stabilized and unstabilized silicone fluids when held at 230° C.

[1]91% 200 cSt PDMS + 9% PDMS containing pendant aminoalkyl groups
[2]65% 300 cSt PDMS + 35% PDMS containing pendant aminoalkyl groups The results presented in FIG. 1 show that with all fluids, a first slow rate of increase in viscosity is followed by a very sharp rise in viscosity, which indicates that the thermal stability has been compromised at this point. The PDMS fluids were only modestly stabilized by iron octoate, but markedly so by the copper complex of the present invention. The copper complex stabilizer of the invention greatly improved stability. The proprietary stabilizer, which is a modified PDMS, showed the best stability. With amine-functional fuser oils, however, the proprietary stabilizer, although much superior to iron octoate, is far less effective than the copper complex of Example 3. The "kick off" point in viscosity of the proprietary stabilizer was reached at about 5 weeks, whereas that of the fuser oil with the stabilizer of Example 3 required in excess of 16 weeks, showing a very high level of thermal stability.

EXAMPLE 6

Improved Thermal Stability in Elastomers

To a condensation curable silicone elastomer composition including a 2000 cSt OH-terminated PDMS, ethyl silicate crosslinker, and iron oxide was added 1.5 weight percent of the copper complex of Example 3 which had been filtered to remove particulates and 0.3 weight percent of dibutyltinbutoxychloride as a condensation catalyst, and well mixed. The compositions were poured into a mold and allowed to cure overnight. Test plaques were stored at room temperature and at 400° F. (204° C.), both for 7 days, and their physical properties were measured. The results in Table 5 below:

TABLE 5

| Physical Property | Control | | With Stabilizer | |
|---|---|---|---|---|
| | RT | 204° C. | RT | 204° C. |
| tensile strength, psi | 752 | 48 | 882 | 564 |
| elongation, % | 131 | 102 | 153 | 123 |
| tear, lbs/in | 36 | 28 | 31 | 25 |
| Durometer, Shore A | 51 | 49 | 48 | 46 |

The results show a considerable overall increase in stability, as shown by retention of physical properties, particularly tensile strength and elongation, when a stabilizer of the present invention is used.

EXAMPLE 7

Improved Stability in Liquid Rubber

A commercially available liquid rubber composition which cures through hydrosilylation, available from Wacker Chemical Corp., Adrian, Mich. as ELASTOSIL LR® 3003/40 (A and B parts) is used with and without the filtered copper complex stabilizer of Example 3 in an amount of 1.5% by weight. Equal parts of the A and B sides were homogenously mixed, and stabilizer added followed by further mixing and degassing. Plaques were press molded conventionally in a heated press at 330° C. for 5 minutes. Physical properties were measured after storage at room temperature ("RT") for 7 days and after storage at 400° F. (204° C.) for 7 days. The results are presented below in Table 6:

TABLE 6

| | Control (no stabilizer) | | With 1.5% Stabilizer | |
|---|---|---|---|---|
| Property | RT | 204° C. | RT | 204° C. |
| tensile strength, psi | 1386 | 1193 | 1385 | 1343 |
| elongation, % | 654 | 451 | 678 | 535 |
| tear, lbs/in | 134 | 218 | 137 | 224 |
| Durometer, Shore A | 39 | 42 | 38 | 41 |

Table 6 indicates that in LSR formulations, the inventive copper complexes show significant improvement in thermal stability with regard to tensile strength and elongation, while tear strength and hardness are maintained.

EXAMPLE 8

To 1500 g of an α-vinyldimethyl-ω-trimethylsilyl capped polydimethylsiloxane also containing an average one methyl (3-aminopropyl)siloxy unit, with a degree of polymerization between 150 and 200 in a reaction flask under nitrogen was added 13.5 g of $CuSO_4.5H_2O$ with stirring, at 35° C. The $CuSO_4$:amine ratio was 1:2. An exotherm raised the temperature to 55° C., and small bubbles of uniform size formed, the color becoming an intense blue. The temperature stabilized at about 73° C., and heat was again applied, the set point being 75° C. Approximately one half hour had elapsed at this point. The temperature rose to 84° C., small bubbles still forming, the liquid appeared to have increased somewhat in viscosity, and appeared to have some pale blue or white suspended particles. Over a period of approximately one hour, the temperature was gradually increased to a maximum of 112° C., and held between 112° C. and 110° C. for an additional half hour. Vigorous bubbling was observed. The heat supply was then removed, and allowed to cool under nitrogen. The blue liquid product was filtered through a 25 μm paper filter, and had a viscosity of 911 mPa·s at 25° C. NMR confirmed that the product retained vinyl functionality, having 0.54 weight percent vinyl units.

EXAMPLE 9

To 51.57 g of 3-aminopropylmethyldiethoxysilane was added 0.25 g $CuSO_4.5H_2O$. The mixture was heated to 70° C., whereupon the copper sulfate crystals gradually dissolved, and the solution turned bright blue.

EXAMPLE 10

Thermal stability was assessed for an amine-containing fuser oil consisting of 65 weight percent of a polydimethylsiloxane fluid with a degree of polymerization of 170-180 and containing on average one 3-aminopropylmethylsiloxy group per molecule, and 35 weight percent of a polydimethylsiloxane fluid with a degree of polymerization of about 250. To this oil was added 1.5 weight percent of the filtered copper complex of Example 3. Initial viscosities were measured for the copper complex stabilized fluid and an unstabilized fluid, and then the fluids were introduced into a 250° C. forced air oven, capped with foil. Viscosities were measured periodically. After two days, the unstabilized fluid was golden brown, while the stabilized fluid was deep brown. The unstabilized fluid gelled after two weeks, while the stabilized fluid gelled after 8.5 weeks.

EXAMPLE 11

The procedure of Example 10 was followed, but with a mercaptoalkyl fluid containing approximately 90 weight percent of a 300 cSt PDMS fluid and 10 weight percent of a branched trimethylsilyl-terminated polydimethylsiloxane fluid containing on average one unit of the formula $HS(CH_2)_3SiO_{3/2}$. The unstabilized fluid showed a rapid increase in viscosity after nine days, gelling shortly thereafter, whereas the same fluid containing 1.5 weight percent of the copper complex stabilizer did not exhibit a rapid viscosity until approximately 2 weeks, being gelled by three weeks time.

EXAMPLE 12

The effectiveness of the copper complex of a vinyl-functional silicone prepared in accordance with Example 8 was assessed in a 50 Shore A, peroxide cured silicone rubber. To 100 parts of silicone rubber base ELASTOSIL® R 401/50S containing about 27 weight percent fumed silica, available from Wacker Chemicals, was added 1 to 4 parts of the copper complex with residual vinyl functionality obtained in Example 7, and 0.8 g of 2,5-dimethyl-2,5-di(t-butylperoxy) hexane, 50% assay, as the peroxide free radical catalyst. The mixture was thoroughly homogenized, degassed, and molded into test plaques for 10 minutes at 171° C. (340° F.). Initial physical properties were measured as well as the physical properties after aging for 70 hours at 225° C. (437° F.) and 260° C. (500° F.). The results are presented in Table 7 below:

TABLE 7

|  | Cu complex, pph | | | | |
| --- | --- | --- | --- | --- | --- |
|  | 0.00 | 1.00 | 2.00 | 3.00 | 4.00 |
| Durometer (initial) | 48 | 48 | 49 | 49 | 49 |
| Durometer (aged, 225° C.) | 61 | 57 | 56 | 56 | 55 |
| Durometer (aged, 260° C.) | 94 | 57 | 56 | 55 | 55 |
| Tensile strength, MPa (initial) | 11.83 | 11.29 | 11.26 | 10.57 | 10.69 |
| Tensile strength change, % (aged, 225° C.) | −50.06 | −32.74 | −36.13 | −34.90 | −35.40 |
| Tensile strength change, % (aged, 260° C.) | −61.83 | −71.04 | −59.77 | −56.82 | −55.19 |
| Elongation (initial) | 657 | 647 | 634 | 627 | 627 |
| Elongation change, % (aged, 225° C.) | −57.53 | −21.95 | −22.71 | −21.53 | −21.85 |
| Elongation change, % (aged, 260° C.) | −98.17 | −57.34 | −36.44 | −30.62 | −29.03 |

EXAMPLE 13

Example 12 was repeated, but with a different rubber base providing a Shore A 60 rubber, ELASTOSIL® 401/60S, also containing 27 weight percent fumed silica. The stabilized rubber of the invention contained 3 parts of the copper complex stabilizer of Example 7, and was compared to the control containing no stabilizer, and a comparative rubber containing 0.75 parts of 90% cerium oxide hydrate, a common stabilizer. Plaques were cured for 10 minutes at 271° C. The results are presented in Table 8 below:

TABLE 8

| Physical Property | Control | 3 parts Cu Stabilizer | 0.75 parts Ce Stabilizer |
| --- | --- | --- | --- |
| Durometer, initial | 58 | 58 | 57 |
| Durometer (aged, 225° C.) | 70 | 63 | 64 |
| Durometer (aged, 260° C.) | 75 | 64 | 70 |
| Tensile strength, MPa | 9.49 | 9.28 | 8.81 |
| Tensile strength change, % (aged, 225° C.) | −44.59 | −24.37 | −26.68 |
| Tensile strength change, % (aged, 260° C.) | −76.33 | −46.06 | −43.19 |
| Elongation, initial | 485 | 497 | 473 |
| Elongation change, % (aged, 225° C.) | −62.47 | −2.41 | −4.86 |
| Elongation change, % (aged, 260° C.) | −86.80 | −18.91 | −25.58 |

EXAMPLE 14

Example 12 was repeated, but with a peroxide cured silicone base rubber B1576 containing 18% by weight fumed silica and 18 weight percent quartz powder. In addition to the control with no stabilizer, a comparative rubber containing a stabilizer consisting of 35% fumed titanium dioxide dispersed in silicone gum was also tested. The results are presented in Table 9 below:

TABLE 9

| Physical Property | Control | 1.50 TiO$_2$ stabilizer | Cu Stabilizer, parts | | | |
| --- | --- | --- | --- | --- | --- | --- |
|  |  |  | 1.0 | 2.0 | 3.0 | 4.0 |
| Durometer, initial | 49 | 49 | 48 | 47 | 46 | 45 |
| Durometer (aged, 225° C.) | 46 | 46 | 45 | 45 | 44 | 43 |
| Durometer (aged, 260° C.) | 40 | 40 | 38 | 37 | 36 | 35 |
| Tensile strength, MPa | 7.52 | 7.51 | 7.31 | 6.90 | 6.78 | 6.82 |
| Tensile strength change, % MPa (aged, 225° C.) | −25.02 | −23.14 | −20.38 | −15.98 | −13.43 | −18.00 |
| Tensile strength change, % MPa (aged, 260° C.) | −40.42 | −42.52 | −42.45 | −37.56 | −41.61 | −42.87 |
| Elongation, initial | 321 | 326 | 326 | 328 | 328 | 361 |
| Elongation change, % (aged, 225° C.) | −19.31 | −5.52 | −11.35 | −3.66 | −7.32 | −11.08 |
| Elongation change, % (aged, 260° C.) | 10.90 | −1.53 | 5.21 | 5.49 | 2.44 | −5.54 |

17

EXAMPLE 15

Example 12 was repeated, but with a liquid silicone rubber ("LSR") base, to produce a Shore A 50 rubber. The vinyl-containing copper complex of Example 7 was employed in amounts of 0 (control), 1, 2, 3, and 4 parts per 100 parts of ELASTOSIL® LR 3003/50 (A/B). Plaques were cured for 5 minutes at 330° F. (166° C.). The results are presented below in Table 10:

TABLE 10

|  | Cu complex, pph | | | | |
| --- | --- | --- | --- | --- | --- |
|  | 0.00 | 1.00 | 2.00 | 3.00 | 4.00 |
| Durometer (initial) | 50 | 50 | 49 | 48 | 47 |
| Durometer (aged, 225° C.) | 52 | 52 | 51 | 51 | 50 |
| Durometer (aged, 260° C.) | 89 | 58 | 57 | 58 | 56 |
| Tensile strength, MPa (initial) | 10.54 | 10.39 | 10.09 | 10.51 | 10.12 |
| Tensile strength change, % (aged, 225° C.) | −48.99 | −37.96 | −39.75 | −43.50 | −39.17 |
| Tensile strength change, % (aged, 260° C.) | −74.69 | −83.28 | −81.49 | −81.04 | −81.61 |
| Elongation (initial) | 535 | 562 | 547 | 580 | 594 |
| Elongation change, % (aged, 225° C.) | −62.43% | −52.67% | −48.63% | −48.97% | −48.15% |
| Elongation change, % (aged, 260° C.) | −98.69% | −91.64% | −89.95% | −89.66% | −89.06% |

EXAMPLE 16

Example 8 was repeated, but the starting vinyl-functional organopolysiloxane was first filtered to remove any salts present from its preparation. Following reaction with copper (II) sulfate, the product was a pale blue clear fluid containing less than 20 ppm Cu.

EXAMPLE 17

Example 16 was repeated, but potassium acetate was added in an amount of 0.05 weight percent along with the copper(II) sulfate. The product was clear with a deep blue color and a Cu content of >780 ppm. The product was of a higher viscosity than that of Example 16.

EXAMPLE 18

To 200 g of an aminopropyl-terminated polydimethylsiloxane containing on average one 3-aminopropyl methylsiloxy group and about 250 repeating dimethylsiloxy units in a three-neck round bottom flask was added 0.1 g potassium acetate, and then 0.31 g anhydrous copper(II) chloride at room temperature, and stirring was commenced. A slight exotherm raised the temperature to about 49° C. over a period of about 25 minutes. When the temperature began to decline (44° C.), a heating mantle surrounding the flask was set to 50° C. The fluid had been bluish-grey, with particles still present, but rapidly turned more blue color as the temperature slowly rose to a maximum of 73° C., when the color was an intense blue. After one half hour, power to the heating mantle was turned off, and the mixture left under nitrogen overnight. The product was filtered through Whatman #1 filter paper, and resulted in a clear, intense blue filtrate. The fluid was analyzed and was found to have a viscosity of 880 mPa·s, an amine equivalent weight of 0.0472 meq/g, and 106 ppm Cu.

EXAMPLE 19

Example 18 was repeated, but with 0.42 g of anhydrous copper(II) acetate rather than 0.31 g of copper(II) chloride.

18

The progress of the reaction was similar to that of Example 16, but the color was initially pale blue, which deepened progressively with time. The reaction lasted in total approximately two and one half hours. The product was left overnight under nitrogen and filtered as in Example 16. The product was a clear intense blue liquid. The product was analyzed and found to have a viscosity of 817 mPa·s, an amine equivalent weight of 0.0549 meq/g, and 177 ppm Cu.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A composition comprising a liquid copper-containing complex of an aminoorgano-functional organosilicon compound, prepared by reaction of a copper(II) compound with an aminoorgano-functional organosilicon compound in a Cu:amine ratio of greater than 0.01:1, wherein the organosilicon compound is selected from the group consisting of polyorganosiloxanes bearing a single aminoorgano group, polyorganosiloxanes bearing two aminoorgano groups, water-incompatible polyorganosiloxanes bearing more than two aminoorgano groups, silanes bearing both an aminorgano group and a group containing ethylenic or ethylynic unsaturation, and mixtures thereof.

2. The composition of claim 1, wherein the organosilicon compound is an aminoorgano-functional linear or lightly branched polyorganosiloxane.

3. The composition of claim 1, wherein at least one copper (II) compound is selected from the group consisting of copper (II) halides, copper(II) carboxylates, and copper(II) sulfate.

4. The composition of claim 1, wherein the organosilicon compound contains silicon-bonded hydroxyl groups, silicon-bonded alkoxy groups, silicon-bonded hydrocarbon groups containing C-C multiple bonds, or a mixture thereof.

5. The composition of claim 1, wherein the organosilicon compound comprises at least one aminoorgano group of the formula wherein n is 0-10,
R is hydrogen, a $C_{1-18}$ alkyl group, a $C_{6-20}$ aryl group, a $C_{7-21}$ arylalkyl group, or $C_{7-21}$ alkaryl group, R' is a divalent $C_{1-20}$ linear or branched hydrocarbon radical optionally interrupted by one or more non-adjacent oxygen atoms; and R" is a divalent SiC-bonded linear or branched $C_{1-20}$ organic group optionally interrupted by one or more non-adjacent N, O, or S atoms.

6. The composition of claim 1, wherein the organopolysiloxane further comprises at least one functional group selected from the group consisting of vinyl-functional siloxy groups, alkoxy-functional siloxy groups, and mixtures thereof.

7. The composition of claim 1, wherein copper is present in the complex in an amount of from 20 ppm to 2000 ppm based on the weight of the complex.

8. The composition of claim 1, wherein during or following the reaction of the copper (II) compound with the aminoorgano-functional organosilicon compound, any water present is removed.

9. The composition of claim 1, wherein the aminoorgano-functional organosilicon compound is an organopolysiloxane bearing one or two aminoorgano groups.

10. A method of increasing the thermal stability of a polymer composition, comprising adding to said polymer composition an effective stabilizing amount of a copper-containing complex composition comprising at least one copper-containing complex of an aminoorgano-functional organosilicon compound, prepared by reaction of a copper(II) compound with an aminoorgano-functional organosilicon compound in a Cu:amine ratio of greater than 0.01:1.

11. The method of claim 10, wherein the polymer is an aminoorgano-functional organopolysiloxane fluid or a mercaptoalkyl-functional organopolysiloxane fluid.

12. The method of claim 10, wherein the polymer composition is an addition-curable organopolysiloxane composition containing an addition catalyst, and the copper-containing complex is prepared from an organosilicon compound bearing at least one hydrocarbon group containing a carbon-carbon multiple bond.

13. The method of claim 12, wherein the addition-curable composition comprises an Si-H-functional crosslinker and the addition catalyst is a hydrosilylation catalyst.

14. The method of claim 10, wherein the polymer composition is a condensation-curable organopolysiloxane composition, and the copper-containing complex is prepared from an organosilicon compound containing at least one silicon-bonded alkoxy group.

15. A liquid fuser oil composition comprising:
a) at least one copper-containing complex of an aminoorgano-functional organosilicon compound, prepared by reaction of a copper(II) compound with an aminoorgano-functional organosilicon compound in a Cu:amine ratio of greater than 0.01:1, and
b) at least one organopolysiloxane different from the copper-containing complexes a).

16. A crosslinked silicone elastomer composition, wherein a copper-containing complex of an aminoorgano-functional organosilicon compound, prepared by reaction of a copper(II) compound with an aminoorgano-functional organosilicon compound in a Cu:amine ratio of greater than 0.01:1 is chemically bonded to the silicone elastomer.

17. The silicone elastomer of claim 16, which is an addition-crosslinked organopolysiloxane and the copper-containing complex of the aminoorgano-functional organosilicon compound further comprises at least one silicon-bonded hydrocarbon containing at least one carbon-carbon multiple bond.

18. The silicone elastomer of claim 16, which is a condensation curable organopolysiloxane and the copper complex of an aminoorgano-functional organosilicon compound contains at least one silicon-bonded alkoxy group.

19. The liquid fuser oil of claim 15, wherein the copper-containing complex a) is present in an amount of 0.1 weight percent to 10 weight percent based on the total weight of the fuser oil composition.

20. The fuser oil composition of claim 15, wherein at least one organopolysiloxane b) is selected from the group consisting of organopolysiloxanes bearing mercaptoalkyl functionality, organopolysiloxanes bearing aminoalkyl functionality, organopolysiloxanes bearing fluorinated alkyl groups, organopolysiloxanes bearing phenol groups, and non-functional organopolysiloxanes.

21. A composition comprising a copper-containing complex of an aminoorgano-functional organosilicon compound, prepared by reaction of a copper(II) compound with an aminoorgano-functional organosilicon compound in a Cu:amine ratio of greater than 0.01:1, wherein the aminoorgano-functional organosilicon compound is a silane of the formula I $$ASiH_xR_a^1R_b^2R_c^3$$

where
A is an aminoorgano group,
$R^1$ is a $C_{1-20}$ optionally substituted hydrocarbon radical,
$R^2$ is a monovalent, optionally substituted SiC-bonded hydrocarbon radical containing at least one aliphatic carbon-carbon multiple bond,
$R^3$ is a hydrolysable group,
x, a, b, and c are each integers from 0 to 3, with the proviso that the sum of x, a, b, and c is 3, and with the further proviso that when b is 0, c is 0, 1, or 2.

22. The composition of claim 21, wherein c is 0.

23. In a xerographic reproduction process wherein a fuser oil is incorporated into a polymer roller or applied to a surface of the polymer roller, the improvement comprising incorporating into the polymer roller and/or applying to the polymer roller, a fuser oil comprising a copper-containing complex of an aminoorgano-functional organosilicon compound, prepared by reaction of a copper(II) compound with an aminoorgano-functional organosilicon compound in a Cu:amine ratio of greater than 0.01:1.

* * * * *